US006756708B2

(12) United States Patent
Koeneman

(10) Patent No.: US 6,756,708 B2
(45) Date of Patent: Jun. 29, 2004

(54) ELECTRONIC CIRCUIT INCORPORATING A MICRO-ELECTROMECHANICAL ENERGY STORAGE DEVICE

(75) Inventor: Paul B. Koeneman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/231,912

(22) Filed: Aug. 29, 2002

(65) Prior Publication Data

US 2004/0041488 A1 Mar. 4, 2004

(51) Int. Cl.[7] ........................... H02K 31/00; B81B 5/00

(52) U.S. Cl. ................ 310/40 MM; 310/74; 310/68 R; 310/178; 310/DIG. 6

(58) Field of Search .......................... 310/40 MM, 178, 310/74, DIG. 6, 68 R; 322/4

(56) References Cited

U.S. PATENT DOCUMENTS

| | | | | |
|---|---|---|---|---|
| 5,451,825 A | | 9/1995 | Strohm | 310/178 |
| 5,481,149 A | | 1/1996 | Kambe et al. | 310/178 |
| 5,530,309 A | | 6/1996 | Weldon | 310/178 |
| 5,587,618 A | | 12/1996 | Hathaway | 310/178 |
| 5,783,879 A | | 7/1998 | Furlani et al. | 310/40 MM |
| 5,821,659 A | | 10/1998 | Smith | 310/178 |
| 5,822,839 A | | 10/1998 | Ghosh et al. | 29/596 |
| 6,051,905 A | | 4/2000 | Clark | 310/178 |
| 6,534,887 B1 | * | 3/2003 | Peczalski et al. | 310/90.5 |

FOREIGN PATENT DOCUMENTS

WO WO 95/08210 3/1995

OTHER PUBLICATIONS

Peczalski et al. "Micro–wheels for Attitude Control and Energy Storage in Small Satellites" Aerospace Conference, 2001, IEEE Proceedings. , vol: 5, 2001 pp. 2483–2492, vol. 5.*

Koeneman et al. "Feasibility of Micro Power Supplies for MEMS" Journal of Microelectromechanical Systems, vol. 6 Issue 4, Dec. 1997, pp. 355–362.*

Driga, M.D. et al, "Electromagnetically Levitated Flywheel Energy Storage System with very low internal Impedance" Pulsed Power Conference, 1997. Digest of Technical Papers. 1997 11th IEEE International, vol: 2, Jun. 29–Jul. 2, 1997, pp. 1560–1565.*

U.S. patent application Ser. No. 10/231,499, Koeneman, filed Aug. 29, 2002.

U.S. patent application Ser. No. 10/231,498, Koeneman, filed Aug. 29, 2002.

U.S. patent application Ser. No. 10/270,993, Koeneman, filed Oct. 15, 2002.

* cited by examiner

*Primary Examiner*—Burton Mullins
(74) *Attorney, Agent, or Firm*—Sacco & Associates, PA

(57) ABSTRACT

A compact high current source including a homopolar generator integrally formed on a substrate. An electronic circuit also can be disposed on the substrate, homopolar generator on a single integrated circuit. The for example, with the homopolar generator to produce a pulsed electronic circuit can be coupled to the homopolar generator to produce a pulsed high current output from a continuous lower current input. The electronic circuit can include at least one electronically controlled switch responsive to a control signal for alternately connecting the homopolar to a current source and to a load. A controller can be used to generate the control signal.

9 Claims, 5 Drawing Sheets

ELECTRONIC CIRCUIT INCORPORATING A MICRO-ELECTROMECHANICAL ENERGY STORAGE DEVICE

BACKGROUND OF THE INVENTION

Statement of the Technical Field

The inventive arrangements relate generally to the field of energy storage, and more particularly to an energy storage device incorporated onto substrate materials.

Description of the Related Art

Shrinking geometries and increasing clock speeds have consistently driven down the supply voltages for central processing units (CPUs), digital signal processors (DSPs), and other printed circuit board devices. Currently these devices can operate in the +1.0 V to +2.0 V range, but operational voltages will decrease further as operational Importantly, the capacitors typically have relatively high values of capacitance so that the capacitors can store enough energy to supply adequate levels of current. In consequence, capacitors that are used to supplement supply current tend to be fairly large. In order to minimize the slew rate and voltage between the capacitors and the circuit device having the high current requirements, the capacitors also are usually located near the circuit device to minimize circuit resistance and inductance between the capacitors and the circuit device. Locating large capacitors on a printed circuit board at the proper location often can be challenging, however. In particular, the capacitors can limit the extent to which the size of a circuit board can be reduced. Moreover, the capacitors can interfere with the mating of the circuit board to other devices.

SUMMARY OF THE INVENTION

The present invention relates to a compact high current source including a homopolar generator integrally formed on a substrate. An electronic circuit is disposed on the substrate as well. In one arrangement, the homopolar generator and the electronic circuit can be formed on a single integrated circuit. The electronic circuit is coupled to the homopolar generator to produce a pulsed high current output from a continuous lower current input. The electronic circuit can include at least one electronically controlled switch responsive to a control signal for alternately connecting the homopolar generator to a current source and to a load. A controller can be used to generate the control signal. Further, the load can have a duty cycle and the electronically controlled switch can cause the current source to connect to the homopolar generator during an off portion of the load duty cycle and connect the homopolar generator to the load during an on portion of the load duty cycle.

The substrate material can be ceramic and/or a semiconductor. For example, the substrate can be a low temperature co-fired ceramic. The homopolar generator can include a circular recess formed in the substrate and at least one conductive disk rotatably disposed within the circular recess. The homopolar generator also can include a magnetic field source and a controller in the electronic circuit for selectively controlling an intensity of a magnetic field produced by the magnetic field source.

DETAILED DESCRIPTION OF THE PREFERRED EMBODIMENTS

The present invention relates to a micro-electromechanical homopolar generator (MEHG) manufactured on a substrate. Notably, the MEHG is an energy storage device that can be used in place of a capacitor in a variety of applications. For example, the MEHG can be used as a compact current source, thereby eliminating the need for large capacitors that are commonly used to supplement a power supply during peak current demand. Such capacitors are generally too large to be incorporated into an integrated circuit (IC) package, having energy storage densities on the order of 0.1 mJ/mm$^3$. By comparison, the MEHG can provide a typical energy storage density on the order of 10 mJ/mm$^3$, and in some instances on the order of 1 J/mm3. Accordingly, the present invention provides the circuit designer with an added level of flexibility by permitting the incorporation of an MEHG into a circuit board substrate or an IC package. This added flexibility enables improved circuit performance and circuit density not otherwise possible.

Figure 1:
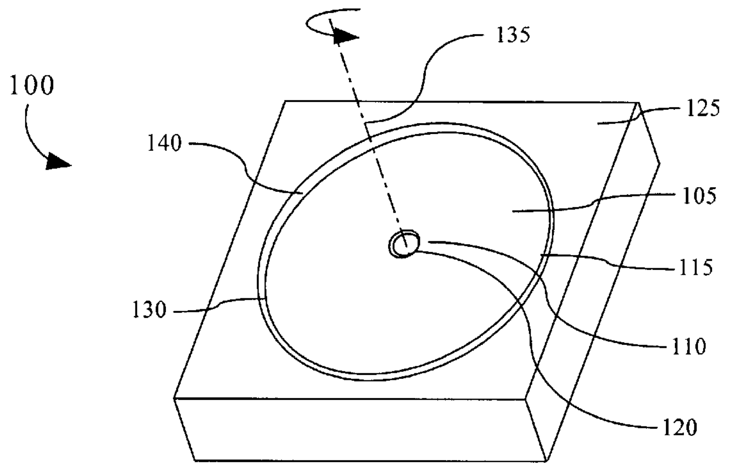
FIG. 1 is a perspective view of an exemplary micro-mechanical homopolar generator in accordance with the present invention.

An exemplary MEHG is shown in FIG. 1. The MEHG 100 includes a conductive disc (disc) 105, or rotor, having a central portion 110 and radial: edge 115. The disc 105 can be positioned proximate to a substrate surface, for example within an aperture 130 formed within a substrate 125. In one arrangement. The disc 105 can be provided with an axle 120 to facilitate rotation about a central axis 135 of the disc 105 and maintain the disc 105 in the proper operating position. But other arrangements can be provided as well. For example, in another arrangement the aperture 130 can be structured with a low friction peripheral surface 140 that maintains the disc 105 within the aperture 130. In yet another arrangement a hole can be provided at the central axis 135 of the disc 105. The hole can fit over a cylindrical structure, such as a bearing, to maintain the operating position of the disc 105.

Figure 2:
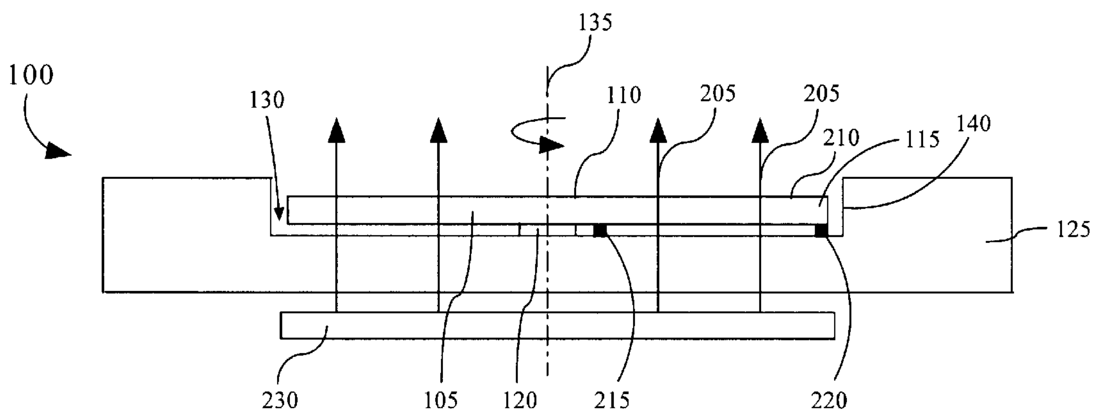
FIG. 2 is a side view of the exemplary micro-mechanical homopolar generator in accordance with the present invention.

Referring to FIG. 2, the rotatable conductive disc 105 is immersed in a magnetic field, illustrated with magnetic field lines 205, which are typically perpendicular to a surface 210 of the disc 105. One or more magnets 230 can be provided above and/or below the conductive disc 105 to generate the magnetic field. The magnets 230 can include permanent magnets and/or electromagnets. A first contact brush 215 can contact. The disc near its central portion 110, which is proximate to the disc axis of rotation 135. A second contact brush 220, which is radially spaced from the first contact brush 215, can contact the radial edge 115 of The disc 105. In one arrangement, a contact brush (not shown) can be provided to contact the axle 120. Additional contact brushes also can be provided. For example, contact brushes can be spaced in a circular pattern to contact multiple points on the radial edge 115. Likewise, contact brushes can be spaced near the central portion 110 of the disc 105 to contact the central portion 110 at multiple points or to contact the axle 120 at multiple points.

When voltage is applied across the contact brushes 215 and 220, causing current to flow through the disc 105, magnetic forces are exerted on the moving charges. The moving charges in turn exert the force to the disc 105, thereby causing the disc 105 to rotate and store kinetic energy. When the voltage source is replaced with an electrical load, the kinetic energy stored in the rotating disc 105 can be used to generate electricity. As the conductive disc 105 rotates within the magnetic field, an electromotive force (emf) is induced in the disc 105, thereby causing current flow through the load.

The amount of voltage ($V_t$) that is generated by the MEHG 105 is approximately given by the formula $$V_t = \frac{\omega_m B(r_2^2 - r_1^2)}{2},$$

where $\omega_m$ is angular velocity of disc, B is the flux density of the magnetic field that is perpendicular to the motor, $r_1$ is the radial distance between the center of the disc 105 and the first contact brush 215, and $r_2$ is the radial distance between the center of the disc 105 and the second contact brush 220. Further, the impedance (Z) of the MEHG is given by the formula $$Z = \frac{B^2}{2\pi t\rho}\frac{1}{j\omega}$$

and the equivalent capacitance (C) is given by $$C = \frac{2\pi t\rho}{B^2},$$

where t is the thickness of the rotor, and ρ is the mass density of the rotor material. Further, the time constant (t) for charging the MEHG 105 is proportional to $$\frac{\rho}{B^2}.$$

Accordingly, the flux density of the magnetic field can be varied to adjust the charge time, output current, impedance, and equivalent capacitance of the MEHG 105. For example, if an electromagnet is provided to generate at least a portion of the magnetic field, the current in the electromagnet can be adjusted to adjust the flux density. In particular, reducing current flowing through the conductor of an electromagnet can reduce the magnetic flux density and increasing the current flowing through the conductor of the electromagnet can increase the magnetic flux density. A myriad of devices can be used to vary the current flowing through the conductor of the electromagnet, for example, an amplifier circuit, a rheostat, a potentiometer, a variable resistor, or any other device having an adjustable output current or voltage.

The MEHG 100 can be manufactured on a variety of substrates, for example, ceramic, silicon, gallium arsenide, gallium nitride, germanium, indium phosphide, and any other substrate material suitable for a micro-electromechanical manufacturing process. FIGS. 3A–3D represent an exemplary manufacturing process for manufacturing the MEHG 100 on a ceramic substrate. The ceramic substrate can be made of any suitable ceramic substrate material, for example low temperature co-fired ceramic (LTCC) material. One such LTCC material is Green Tape™ provided by DuPont, 14 NW Alexander Drive, Research Triangle Park, N.C. 27709.

Figure 3C:
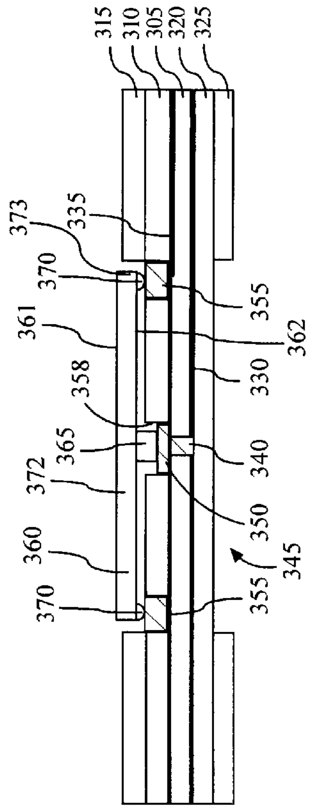
FIGS. 3A–3D illustrate an exemplary process for manufacturing the micro-electromechanical homopolar generator on a ceramic substrate in accordance with the present invention.
Figure 3D:
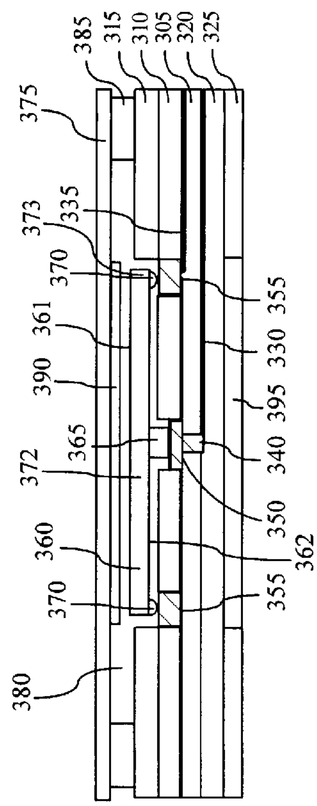
Figure 3A:
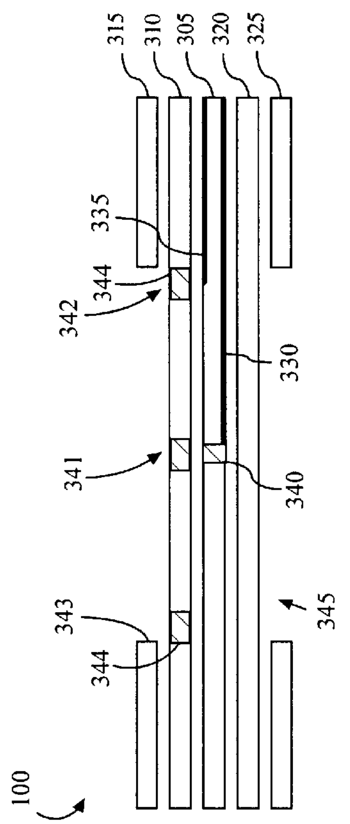

Referring to FIG. 3A, a first ceramic substrate layer 305 can be provided. The ceramic substrate material that is to be used in each of the ceramic substrate layers can be preconditioned before being used in a fabrication process. For example, the ceramic material can be baked at an appropriate temperature for a specified period of time or left to stand in a nitrogen dry box for a specified period of time. Common preconditioning cycles are 120° C. for 20–30 minutes or 24 hours in a nitrogen dry box. Both preconditioning process are well known in the art of ceramic substrates.

Once the first ceramic substrate layer (first ceramic layer) 305 is preconditioned, a conductive via 340 can be formed in the first ceramic layer 305 to provide electrical conductivity through the ceramic layer. Many techniques are available for forming conductive vias in a ceramic substrate. For example, vias can be formed by mechanically punching holes or laser cutting holes into the ceramic substrate. The holes then can be filled with a conductive material, such as a conventional thick film screen printer or extrusion via filler. Vacuum can be applied to the first ceramic layer through a porous stone to aid via filling. Once the conductive via 340 has been formed in the first ceramic layer 305, the conductive material can be dried in a box oven at an appropriate temperature and for an appropriate amount of time. For example, a common drying process is to bake the ceramic substrate having the conductive material at 120° C. for 5 minutes.

After the conductive filler in the via has dried, a first conductive circuit trace 330 and a second conductive circuit trace 335 can be provided. The circuit traces 330 and 335 can be deposited onto the first ceramic layer 305 using a conventional thick film screen printer, for example, standard emulsion thick film screens. In one arrangement the circuit traces 330 and 335 can be deposited onto opposite sides of the first ceramic layer 305, with the first circuit trace 330 being in electrical contact with the conductive via 340. Further, the second circuit trace 335 can extend around, and concentric with, the conductive via 340. Nonetheless, a myriad of other circuit layouts can be provided, as would be known to the skilled artisan. As with the via filling process, once the circuit traces have been applied to the first ceramic layer 305, the circuit traces can be dried in a box oven at an appropriate temperature and for an appropriate amount of time.

Subsequent ceramic substrate layers can be laminated to the first ceramic layer 305 after appropriate preconditioning and drying of circuit traces and/or via fillers. In particular, a second ceramic substrate layer (second ceramic layer) 310 can be stacked onto the first ceramic layer 305. The second ceramic layer 310 can insulate circuit traces on the top of the first ceramic layer 305. The second ceramic layer also can include vias 341 and 342, which can be filled with material to form an axial contact brush 350 and at least one radial contact brush 355, respectively. The vias can be positioned so that the contact brushes make electrical contact with respective circuit traces 330 and 335. In one arrangement, a plurality of radial contact brushes 355 or a continuous radial edge contact brush, can be disposed concentric with, and at a uniform radius from, the axial contact brush 350 to reduce a net contact resistance between the a conductive object and the brushes.

The contact brushes can include any conductive material suitable for use in a contact brush, for example a carbon nano composite or a conductive liquid. In the case that the contact brushes are a solid material, such as carbon nano composite, the contact brushes can be screen printed into the vias in the second ceramic layer 310 using a conventional thick film screen printer. In the case that a conductive liquid is used as contact brushes, ferromagnetic properties can be incorporated into the conductive liquid so that a magnetic field can contain the conductive liquid within the vias 341 and 342. In one arrangement, the axial contact brush 350 can fill only part of the via 341 so that a top surface of the via is disposed below a top surface of the second layer 310. Accordingly, the via 341 also can function as a bearing.

A third ceramic substrate layer (third ceramic layer) 315 can be stacked above the second ceramic layer 310. The third ceramic layer 315 can incorporate an aperture having a radius edge 343 aligned with an outer radius of vias 342 (a portion of the via furthest from the via 341). A fourth ceramic substrate layer (fourth ceramic layer) 320 can be stacked below the first ceramic layer 305 to insulate circuit traces on the bottom of the first ceramic layer 305. Lastly, a fifth ceramic substrate layer (fifth ceramic layer) 325 can be stacked below the fourth ceramic layer 320. As with the third ceramic layer, the fifth ceramic layer also can include an aperture 345 having a radius aligned with the outer radius of vias 342.

Figure 3B:
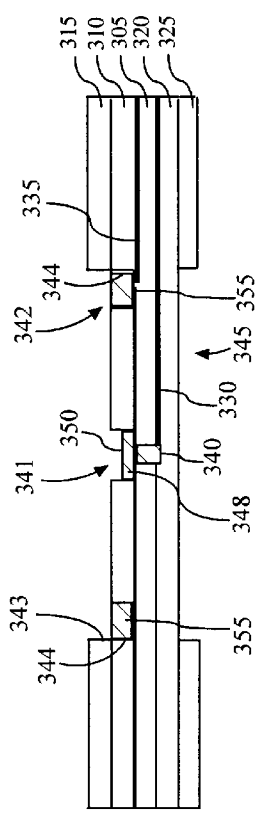

Once the ceramic substrate layers have been stacked to form the substrate structure shown in FIG. 3B, the structure can be laminated using a variety of lamination methods. In one method, the ceramic substrate layers can be stacked and hydraulically pressed with heated platens. For example, a uniaxial lamination method presses the ceramic substrate layers together at 3000 psi for 10 minutes using plates heated to 70° C. The ceramic substrate layers can be rotated 180° following the first 5 minutes. In an isotatic lamination process, the ceramic substrate layers are vacuum sealed in a plastic bag and then pressed using heated water. The time, temperature and pressure can be the same as those used in the uniaxial lamination process, however, rotation after 5 minutes is not required. Once laminated, the structure can be fired inside a kiln on a flat tile. For example, the ceramic substrate layers can be baked between 200° C. and 500° C. for one hour and a peak temperature between 850° and 875° can be applied for greater than 15 minutes. After the firing process, post fire operations can be performed on the ceramic substrate layers.

Referring to FIG. 3C, a conductive disc (disc) 360 having an upper surface 361 and an opposing lower surface 362 can be provided in the MEHG for use as a rotor for storing kinetic energy. In one arrangement, a plurality of conductive discs can be provided to achieve greater energy storage capacity. The disc 360 can include a central contact 365 axially located on the lower surface 362, and at least one radial contact 370, also located on the lower surface 362. In one arrangement, the radial contact 370 can extend around the lower peripheral region 373 of the disc 360. The disc 360 can be positioned above the second ceramic substrate layer 310 so that the central contact 365 makes electrical contact with the axial contact brush 350 and the radial contact 370 makes electrical contact with the radial edge contact brush 355. Accordingly, electrical current can flow between an inner portion 372 of the disc 360 and the peripheral region 373 when voltage is applied across the contact brushes 350 and 355. The radial wall 358 of the aperture 341 can function as a bearing surface for the central contact 365 of the disc 360. Alternatively, bearings (not shown) can be installed between the radial wall 358 and the central contact 365. The bearings can be, for example, electromagnetic or electrostatic bearings.

Referring to FIG. 3D, a lid 375 can be provided above the disc 360 to provide an enclosed region 380 in which the disc 360 can rotate. Dust and other contaminants that enter the enclosed region 380 can increase friction between the contacts 365 and 370 and the contact brushes 350 and 355, which can reduce the efficiency of the MEHG. To reduce contamination, a seal layer 385 can be provided between the third ceramic layer 315 and the lid 375 to form a continuous seal around a periphery of the disc 360.

One or more magnets can be fixed above and/or below the disc 360 to provide a magnetic field aligned with an axis of rotation 135 of the disc 360. For example a magnet 390 can be attached to the bottom of the lid 375, spaced from the upper surface of the disc 361. A magnet 395 also can be spaced from the lower surface 362 of the disc 360. For example, a magnet can be provided beneath the fourth ceramic substrate layer 320, within the aperture 345 of the fifth ceramic substrate layer 325. The magnets 390 and 395 can be permanent magnets, such as magnets formed of magnetic material. For example, the magnets 390 and 395 can be made of ferrite, neodymium, alnico, ceramic, and or any other material that can be used to generate a magnetic field.

The magnets 390 and 395 also can be non-permanent magnets, for example, electromagnets. In another arrangement, the magnets can be a combination of permanent magnets and non-permanent magnets, for example, an electromagnet adjacent to one or more layers of magnetic material. As previously noted, the strength of the magnetic field generated by an electromagnet can be varied by varying the current through the conductor of the electromagnet, which can be useful for varying the output current of the MEHG, also as previously noted.

In another exemplary embodiment, the MEHG 100 can be manufactured on a semiconductor substrate, for example on a silicon substrate using a polysilicon microfabrication process. Polysilicon microfabrication is well known in the art of micromachining. One such process is disclosed in David A. Koester et al., *MUMPs Design Handbook* (Rev. 7.0, 2001). An exemplary polysilicon microfabrication process is shown in FIGS. 4A–4H. It should be noted, however, that the invention is not limited to the process disclosed herein and that other semiconductor microfabrication processes can be used.

Importantly, the MEHG 100 can be fabricated on a substrate of an integrated circuit (IC) to provide a built-in current source. The need for external energy storage capacitors can be thereby eliminated. For example, modern computer systems commonly include a bank of energy storage capacitors immediately next to a central processing unit (CPU). Using the MEHG, energy storage capacity can be fabricated into the CPU chip itself. Further, the MEHG can be incorporated into digital signal processors (DSPs), or any other type of integrated circuit. Moreover, other circuits requiring substantial energy storage capacity can be compactly fabricated onto a single IC chip.

Figure 4A:
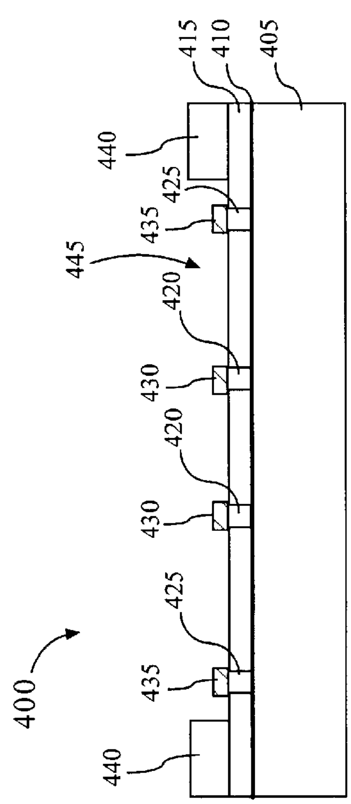
FIGS. 4A–4H illustrate an exemplary process for manufacturing the micro-electromechanical homopolar generator on a silicon substrate in accordance with the present invention.

Referring to FIG. 4A, a first silicon substrate layer (first silicon layer) 405 can be provided to begin forming the MEHG structure 400, for example, a silicon wafer typically used in IC manufacturing. It may be desirable to for the first silicon layer 405 to have electrically insulating properties. Accordingly, the first silicon layer 405 can be formed without doping or have only a light doping. Alternatively, an electrically insulating layer can be applied over the first silicon layer 405. For example, a layer of silicon dioxide can be applied over the first silicon layer 405. A conductive layer can be deposited onto the substrate, from which circuit traces 410 can be etched. For example, a conductive layer of doped polysilicon or aluminum can be deposited onto the substrate. After deposition of the conductive layer, conductive traces 410 can be defined using known lithography and etching techniques.

After the circuit traces are formed, an electrically insulating layer 415, such as silicon nitride (SiN), can be deposited over the first substrate and circuit traces. For example, low pressure chemical vapor deposition (LPCVD) involving the reaction of dichlorosilane ($SiH_2Cl_2$) and ammonia ($NH_3$) can be used for this purpose to deposit an insulating layer. A typical thickness for the SiN layer is approximately 600 nm.

Inner vias 420 and outer vias 425 then can be formed through the insulating layer 415 and filled with electrically conductive material (e.g. Aluminum) to electrically contact the circuit traces 410 at desired locations. Axial contact brushes 430 then can be deposited on inner vias 420 and radial edge contact brushes 435 can be deposited on outer vias 425 so that the contact brushes 430 and 435 can be electrically continuous with the respective vias 420 and 425. Accordingly, the electrical contact brushes are electrically continuous with respective ones of circuit traces 410. Two axial contact brushes 430 and two radial edge contact brushes 435 are shown in the figure, but additional axial and radial edge contact brushes can be provided. Further, the contact brushes can include any conductive material suitable for use in a contact brush, for example a carbon nano composite, which can be applied using a thermo spray method commonly known to the skilled artisan. In another arrangement the contact brushes can be a conductive liquid.

A first structural layer of polysilicon (poly 1) 440 can be deposited onto the insulating layer 415 using LPCVD. The poly 1 layer then can be etched to form a radial aperture 445 which exposes the contact brushes 430 and 435. In an alternate arrangement, the aperture 445 region can be masked prior to application of the poly 1 layer 440, thereby preventing deposition in the aperture 445 region.

Figure 4B:
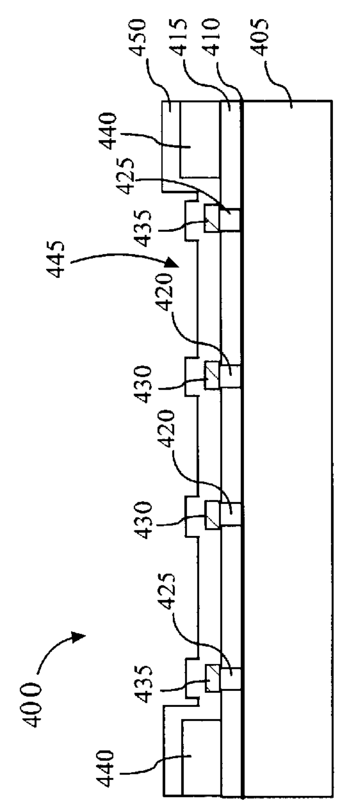
Figure 4C:
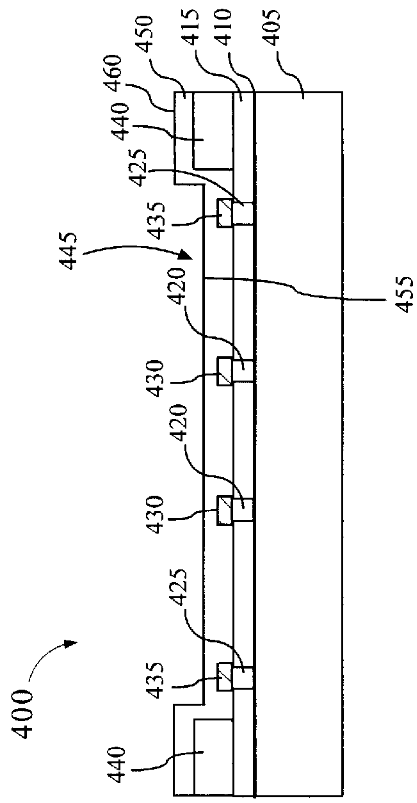

Referring to FIG. 4B, a first sacrificial layer 450, for example silicon dioxide ($SiO_2$) or phosphosilicate glass (PSG), can be applied to the substrate over the previously applied layers. The first sacrificial layer 450 is removed at the end of the process, as is further discussed below. The sacrificial layer can be deposited by LPCVD and annealed to the circuit. For example, in the case that PSG is used for the sacrificial layer, the sacrificial layer can be annealed at 1050° C. In argon. The first sacrificial layer 450 then can be planarized within the aperture 445 using a planarizing etch-back process to form a flat base 455 within the aperture 445 that is recessed from an upper elevation 460 of the first sacrificial layer, as shown in FIG. 4C.

Figure 4D:
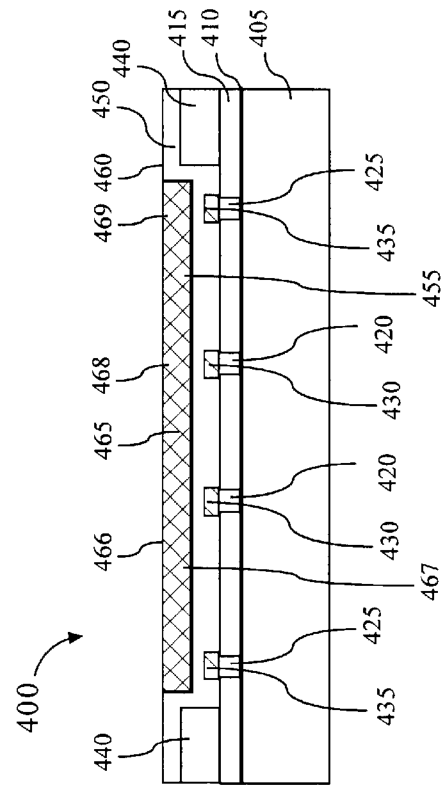

Referring to FIG. 4D, a conductor then can be deposited into the aperture 445 to form a conductive disc (disc) 465 having opposing upper surface 466, a lower surface 467, an inner region 468, and a peripheral region 469. Further, the disc 465 can be wholly contained within the aperture 445 so that the only material contacting the conductive disc 465 is the sacrificial layer. The thickness of the disc 465 can be determined by the thickness of the first sacrificial layer 450 and the amount of etch-back. Importantly, the equivalent capacitance of MEHG is proportional to thickness of disc 465. Accordingly, the thickness of the disc 465 can be selected to achieve a desired equivalent capacitance. Further, mechanical characteristics, such as rigidity, should be considered when selecting a thickness for the disc 465.

Figure 4E:
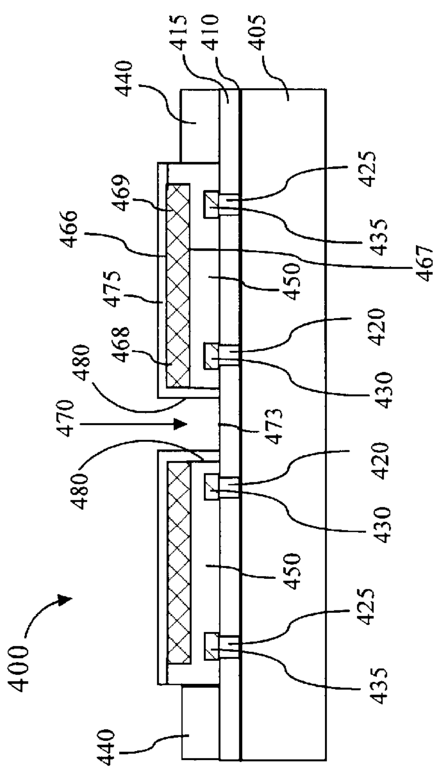

A second aperture 470 then can be etched through the inner region 468 of the disc 465 and through the first sacrificial layer below the center of the disc to expose the second silicon substrate layer 415, as shown in FIG. 4E. Notably, the second aperture 470 can be sized to form a hole in the disc 465 having a radius equal to or smaller than the radial distance between opposing axial contact brushes 430 and 435. Further, the first sacrificial layer in contact with the SiN layer 415 also can be etched away to expose a region 473 of the SiN layer 415 within the second aperture 470. Known etching techniques can be used, for example reactive ion etch (RIE), plasma etching, etc.

A second sacrificial layer 475, for example $SiO_2$ or PSG, then can be applied over an upper surface of the disc 465 and over the radial wall 480 formed by the second aperture 470. Importantly, the region 473 of the SiN layer 415 should be masked during the application of the second sacrificial layer 475 to prevent the second sacrificial layer 475 from adhering to the SiN layer in the region 473. Alternatively, a subsequent etching process can be performed to clear away the second sacrificial layer from the region 473.

Figure 4F:
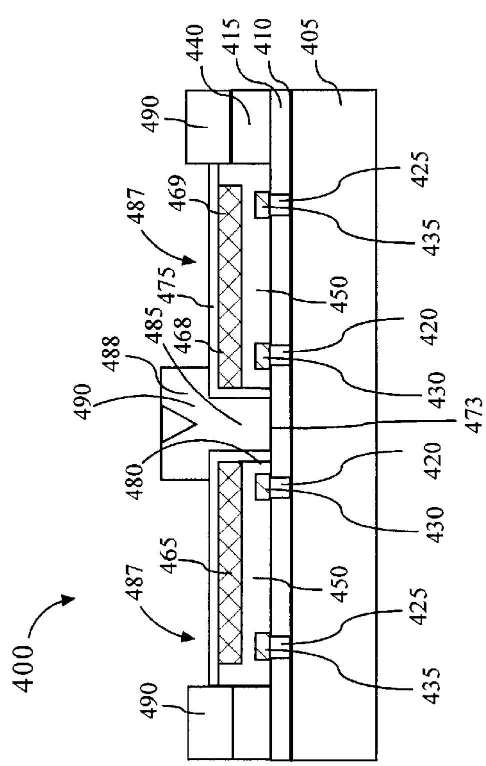

Referring to FIG. 4F, using LPCVD, a second layer of polysilcon (poly 2) 490 can be deposited over the previously applied layers, for example the poly 1 layer.440 surrounding the disc 465, thereby adding an additional silicon structure. Notably, the poly 2 layer 490 also can fill the second aperture 470. A washer shaped region 487 then can be etched to remove a washer shaped portion of the poly 2 layer 490 located above the disc 465. Notably, the inner radius of the washer shaped region 487 can be larger than the inner radius of the disc 465. Accordingly, the etching of the poly 2 layer 490 can leave a structure 485, having a "T" shaped cross section, within the second aperture 470. An upper portion 488 of the structure 485 can extend over the inner portion 468 of disc 465, thereby limiting vertical movement of the disc 465 once the sacrificial layers are removed. Further, the structure 485 can operate as a bearing around which the disc 465 can rotate. Alternatively, electromagnetic or electrostatic bearings can be provided in the second aperture 470.

Figure 4G:
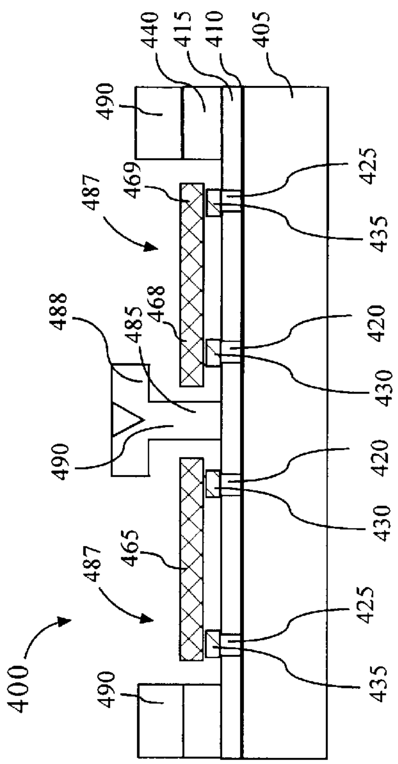

Referring to FIG. 4G, the first and second sacrificial layers 450 and 475 then can be released with a hydrogen fluoride (HF) solution as is known to the skilled artisan. For example, the MEHG structure 400 can be dipped in an HF bath. HF does not attack silicon or polysilicon, but quickly etches $SiO_2$. Notably, the HF can etch deposited $SiO_2$ approximately 100× faster than SiN. The release of the sacrificial layers 450 and 475 enables the disc 465 to rest upon, and make electrical contact with, the axial and radial edge contact brushes 430 and 435. Moreover, the release of the sacrificial layers 450 and 475 frees the disc 465 to rotate about its axis.

Figure 4H:
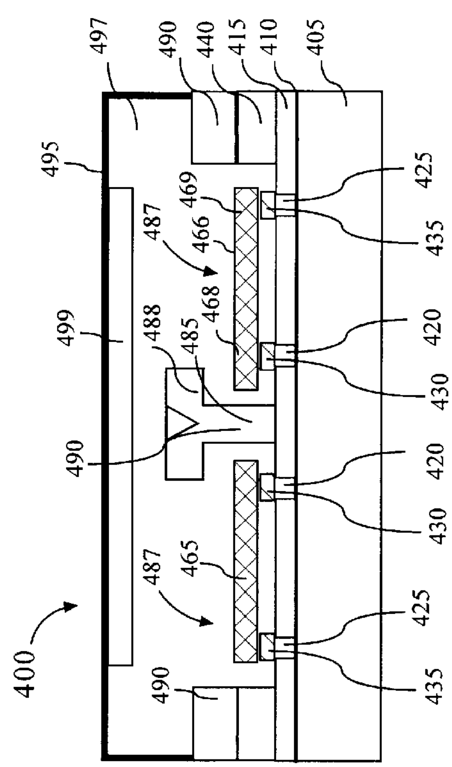

A lid 495 can be provided above the disc 465 to provide an enclosed region 497 in which the disc 475 can rotate, as shown in FIG. 4H. As previously noted, dust and other contaminants that enter the enclosed region 497 can reduce the efficiency of the MEHG. A magnet 499 can be fixed above and/or below the disc 465 to provide a magnetic field aligned with the axis of rotation of the disc 465. For example a magnet can be attached to the bottom of the lid 495, spaced from the upper surface 466 of the disc 465. Further, a magnet can be attached to the bottom of the first silicon substrate below the disc 465, for example with a third silicon substrate layer.

As previously noted, the magnet 499 can be a permanent magnet, non-permanent magnets, or a combination of a permanent magnet and a non-permanent magnet. For example, the magnet can include an electromagnet and one or more layers of magnetic material. The strength of the magnetic field generated by an electromagnet can be varied by varying the current through the conductor of the electromagnet, which can be useful for varying the output current of the MEHG, also as previously noted. In operation, a voltage applied across axial contact brush 430 and radial edge contact brush 435 causes current to flow between a region near the inner radius 472 of the disc 465 and a peripheral region 469 of the disc 465, thereby causing the disc to rotate, as previously described.

Figure 5:
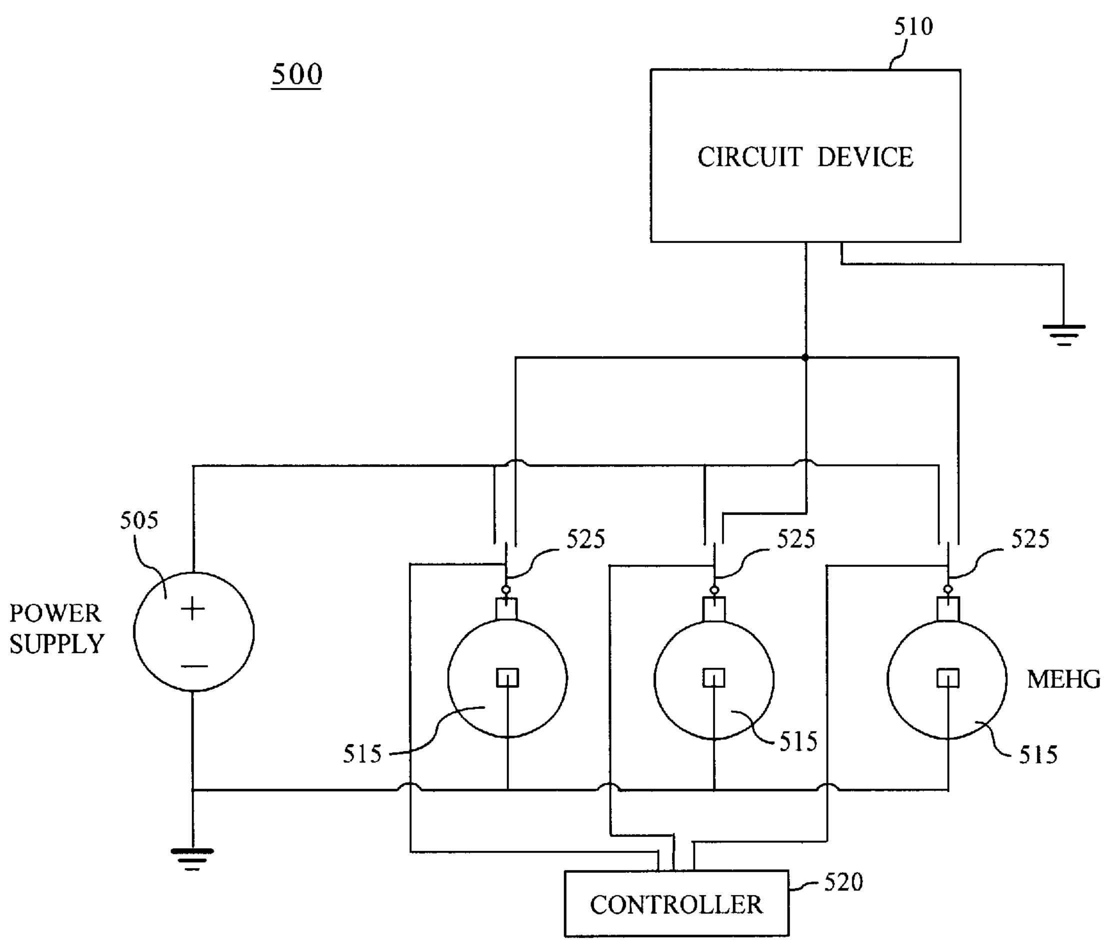
FIG. 5 is an exemplary circuit incorporating a micro-mechanical homopolar generator in accordance with the present invention.

An exemplary circuit 500 in which the MEHG can be used to provide pulsed current to a circuit device 510 is shown in FIG. 5. In addition to the circuit device 510, the circuit can include a power supply 505, at least one MEHG 515, a controller 520, and at least one two-way switch (switch) 525. The power supply 505 can be a conventional DC power supply. For example, the power supply can incorporate batteries or a transformer and rectifier. The switch can include a first terminal connected to the MEHG 515, a second terminal connected to the power supply 505, and a third terminal connected to the circuit device 510. The circuit device 510 can be any circuit device requiring an input current. For example, the circuit device can be an integrated circuit (IC), such as a CPU, a DSP, or any other processor. The circuit device also can be an output device such as a pulsed current digital antenna, a micro electromechanical system (MEMS) actuator, a light emitter, microrobotics devices, and any other output device that requires an input current. Nonetheless, the present invention is not limited to these examples.

Because the MEHG 515 can be manufactured as a mini device or micro device on a substrate, the MEHG can be incorporated into a circuit board or an IC package, thereby enabling the MEHG 515 to be used as a current source in microelectronic circuits. In one arrangement, the circuit device 510, the controller 520, the at least one switch 525, and the at least one MEHG 515 can be incorporated on a circuit in a single substrate, for example on a single wafer or in a single IC package. In particular, the single substrate can include a controller 520, a switch 525 an MEHG 515, and a processor. Moreover, pluralities of these circuits can be provided on a single IC package as well.

In some circuits the energy charge time associated with a MEHG 515 can be longer than the discharge time, which can have the benefit of relieving the power supply from having to supply the instantaneous power requirement of a particular load. But a single MEHG 515 having a charge time longer than the discharge time may not be able to adequately supply a particular current pulse rate required by a specific load 510. To compensate, a plurality of MEHGs 515 can be used to supply current pulses to the load 510, thereby increasing the current pulse rate that a circuit is capable of generating. For example, three MEHGs 515 can be provided in the circuit 500.

The controller 520 can be provided to control the opening and closing of the switches 525, thereby distributing the current requirements among the MEHGs 515 and keeping the MEHGs 515 synchronized. In one arrangement, the closing of the switches 525 can be sequentially synchronized wherein multiple MEHGs 515 generate current pulses in a specific order with no two MEHGs 515 generating simultaneous current pulses. Accordingly, multiple MEHGs 515 can present to the power supply a load that is more steady than when a single MEHG 515 is used. In another arrangement, the MEHGs 515 can be synchronized to simultaneously generate current pulses, thereby increasing an amount of current generated with the pulses.

In addition to MEHG synchronization, the controller 520 also can preform signal processing, such as analog to digital conversion, signal encoding, modulation, etc. For example, the controller 520 can receive an input signal, encode, modulate and digitize the signal, and activate the switches 525 as required to send current pulses corresponding to the digitized signal to a broadcast antenna.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. An integrated circuit comprising:

a homopolar generator integrally formed on a substrate, said homopolar generator being operatively connected to a power source and storing kinetic energy during a first operational state;

a load disposed on said substrate, said load being coupled to said homopolar generator and receiving electric current from said homopolar generator during a second operational state; and an electronic circuit disposed on said substrate, said electronic circuit coupled to said homopolar generator and switching said homopolar generator between said first and second operational states.

2. The integrated circuit according to claim 1, further comprising:

at least one electronically controlled switch disposed on said substrates, said switch responsive to a control signal for alternately connecting said homopolar generator to a said power source and to said load.

3. The integrated circuit according to claim 2, said electronic circuit further comprising a controller for generating said control signal.

4. The integrated circuit according to claim 2, wherein said load has a duty cycle and said controller causes said electronically controlled switch to connect said current source to said homopolar generator during an off portion of said load duty cycle and connect said homopolar generator to said load during an on portion of said load duty cycle.

5. The integrated circuit according to claim 1, wherein a material forming said substrate is selected from the group consisting of a ceramic and a semiconductor.

6. The integrated circuit according to claim 5, wherein said homopolar generator is comprised of a recess formed in said substrate and at least one conductive disk rotatably disposed within said recess.

7. The integrated circuit according to claim 1, wherein said substrate is a low temperature co-fired ceramic.

8. The integrated circuit according to claim 1, wherein said homopolar generator is comprised of a magnetic field source and said electronic circuit comprises a controller for selectively controlling an intensity of a magnetic field produced by said magnetic field source.

9. A central processing unit, comprising:

a homopolar generator integrally formed on a substrate, said homopolar generator being operatively connected to a power source and storing kinetic energy during a first operational state;

electronic circuitry disposed on said substrate, said electronic circuitry being coupled to said homopolar generator and receiving electric current from said homopolar generator during a second operational state; and a control circuit disposed on said substrate, said control circuit coupled to said homopolar generator and switching said homopolar generator between said first and second operational states.

* * * * *

UNITED STATES PATENT AND TRADEMARK OFFICE

CERTIFICATE OF CORRECTION

PATENT NO. : 6,756,708 B2
DATED : June 29, 2004
INVENTOR(S) : Koeneman

It is certified that error appears in the above-identified patent and that said Letters Patent is hereby corrected as shown below:

Title page,
Item [57], ABSTRACT,
Lines 2 and 3, replace with -- An electronic circuit also can be disposed on the substrate, for example, with the homopolar generator on a single integrated circuit. The electronic circuit can be coupled to the homopolar generator to produce a pulsed high current output from a continuous lower current input. --

Column 10,
Line 28, delete "substrates" and replace with -- substrate --.
Line 30, delete "a".

Signed and Sealed this

Third Day of May, 2005

JON W. DUDAS
*Director of the United States Patent and Trademark Office*